US010247211B2

(12) United States Patent
Whitty (10) Patent No.: US 10,247,211 B2
(45) Date of Patent: Apr. 2, 2019

(54) SPINE OR WHEEL OF INTERCONNECTED UNITS (71) Applicant: Angus Norman Whitty, Burnham (GB)

(72) Inventor: Angus Norman Whitty, Burnham (GB)

(*) Notice: Subject to any disclaimer, the term of this patent is extended or adjusted under 35 U.S.C. 154(b) by 0 days.

(21) Appl. No.: 15/577,528

(22) PCT Filed: May 27, 2016

(86) PCT No.: PCT/GB2016/051561
§ 371 (c)(1),
(2) Date: Nov. 28, 2017

(87) PCT Pub. No.: WO2016/193688
PCT Pub. Date: Dec. 8, 2016

(65) Prior Publication Data
US 2018/0142712 A1     May 24, 2018

(30) Foreign Application Priority Data
May 29, 2015   (GB) .................................. 1509278.6

(51) Int. Cl.
*F16B 2/08* (2006.01)
*F16M 11/40* (2006.01)
(Continued)

(52) U.S. Cl.
CPC ............... *F16B 2/08* (2013.01); *F16M 11/40* (2013.01); *F21V 21/10* (2013.01); *F21V 21/116* (2013.01);
(Continued)

(58) Field of Classification Search
CPC . F16B 2/08; F16M 11/40; F21V 21/10; F21V 21/116; F21V 21/28; Y02W 30/829;
(Continued)

(56) References Cited

U.S. PATENT DOCUMENTS 276,472 A    4/1883  Rittenhouse et al.
428,023 A    5/1890  Schoff
(Continued)

FOREIGN PATENT DOCUMENTS

FR    542 264 A    8/1922
GB    1 271 369    4/1972
(Continued)

OTHER PUBLICATIONS

International Search Report dated Aug. 1, 2016 for International application No. PCT/GB2016/051561.
(Continued)

*Primary Examiner* — Anita M King
(74) *Attorney, Agent, or Firm* — Fay Sharpe LLP (57) ABSTRACT A device comprising a plurality of hollow units (11), each unit comprising a circumferential wall (12) having a first end region (5) and a second end region (13), wherein the first end region is narrower than the second end region and the plurality of units are in an interconnected arrangement, such that the first end region of a first unit (14) of the plurality of units is received within the second end region of a second unit (15) of the plurality of units, and a flexible elongate member (3) extends longitudinally through the interconnected units, whereby the circumferential walls of the interconnected first and second units abut each other and the interconnected units are secured together.

10 Claims, 8 Drawing Sheets (51) Int. Cl.

| | |
|---|---|
| *F21V 21/10* | (2006.01) |
| *F21V 21/28* | (2006.01) |
| *F21V 21/116* | (2006.01) |
| *B44C 5/00* | (2006.01) |
| *B60B 19/00* | (2006.01) |
| *F21S 6/00* | (2006.01) |
| *B60B 19/06* | (2006.01) |

(52) U.S. Cl.
CPC ............... *F21V 21/28* (2013.01); *B44C 5/00* (2013.01); *B60B 19/00* (2013.01); *B60B 19/06* (2013.01); *F21S 6/00* (2013.01); *Y02W 30/829* (2015.05)

(58) Field of Classification Search
CPC . B44C 5/00; B60B 19/00; B60B 19/06; F21S 6/00
See application file for complete search history.

(56) References Cited

U.S. PATENT DOCUMENTS

| | | | |
|---|---|---|---|
| 4,396,797 A | | 8/1983 | Sakuragi et al. |
| 2003/0180088 A1* | | 9/2003 | Camevali ............... F16M 11/14 403/56 |
| 2004/0218352 A1 | | 11/2004 | Hillman et al. |
| 2009/0071284 A1 | | 3/2009 | Wen |
| 2009/0250924 A1 | | 10/2009 | Tisbo et al. |
| 2011/0177752 A1 | | 7/2011 | Patsiner |
| 2012/0288269 A1* | | 11/2012 | Jensen ................... F16M 11/14 396/428 |

FOREIGN PATENT DOCUMENTS

| | | |
|---|---|---|
| JP | 8244902 A | 9/1996 |
| WO | WO 90/13767 | 11/1990 |
| WO | WO 92/16412 | 10/1992 |

OTHER PUBLICATIONS

Written Opinion dated Aug. 1, 2016 for International application No. PCT/GB2016/051561.
British Search Report dated Nov. 17, 2015 for Application No. GB 1509278.6.
"My plastic greenhouse" [online] updated Nov. 13, 2014 (from www.archive.org) Archived copy available from: http://web.archive.org/web/20151104002230/http://hubpages.com/living/plasticbottlegreenhouse [Accessed Oct. 14, 2016].
"Plastic Islands" [online] Apr. 8, 2015, (from www.archive.org). Archived copy available from: http://web. archive.org/web/20150510233412/ http://www.veronikarichterova.com/en/plastic-islands-2 [Accessed Oct. 14, 2016].
"A tribute to the PET bottle", 2008 [online] Apr. 10, 2015, (from www.archive.org). Archived copy available from: http://web.archive.org/web/20150410115812/ http://www.veronikarichter ova.com/en/exhibitions/individual/ [Accessed Oct. 14, 2016].

* cited by examiner

SPINE OR WHEEL OF INTERCONNECTED UNITS

BACKGROUND

The present invention relates to a device comprising a plurality of interconnected units preferably arranged in the form of a spine or ring (e.g. a wheel). It is envisaged that the device can be made from cut top parts of PET (polyethylene terephthalate) bottles, for example, which thus provides a second use for the bottles without the expense and time required for a recycling and remoulding process.

By experimenting, it was realised that if units such as portions of PET bottles (for example, by cutting them below the neck) with their curved sloping necks were inserted into other similar such units the resulting structures may have certain useful applications. However, it would be advantageous to make the structures able to be moved into different configurations without the concern that the units of the structure may be disconnected from each other.

SUMMARY

It is therefore an object of the present invention to provide a device comprising a plurality of such interconnected units which also has the above-mentioned advantage.

According to the present invention, there is provided a device comprising: a plurality of hollow units, each unit comprising a circumferential wall having a first end region and a second end region, wherein the first end region is narrower than the second end region and the plurality of units are in an interconnected arrangement, such that the first end region of a first unit of the plurality of units is received within the second end region of a second unit of the plurality of units, and a flexible elongate member extends longitudinally through the interconnected units, whereby the circumferential walls of the interconnected first and second units abut each other and the interconnected units are secured together.

Thus, the device provides configuration of interconnecting units which can be arranged as spine or ring configurations wherein the interconnecting units are nested and secured together by a flexible elongate member. The flexibility of the elongate member enables lateral movement of the individual units relative to the longitudinal axis of the flexible elongate member. Such lateral movement increases the flexibility of the device, which may be, for example, in spine or ring structures. Such bending affords non-linear spine structures and non-planar ring-like structures. Reconfiguration of the devices to its linear and planar configurations is also possible. Such flexibility and readjustment properties of spine and ring like structures have many applications. For example, a flexible and adjustable spine may be used as the stem of a lamp enabling orientation of the lamp bulb as desired. In this case, an electric cable may pass through the length of the nested units alongside the flexible elongate member.

Preferably, the first end region of each circumferential wall is substantially cylindrical, and the circumferential wall comprises a tapered region which tapers towards the first end region. More preferably, the second end region is substantially cylindrical and of greater circumference than the first end region, and wherein the tapered region connects the first end region and second end region. Preferably, the tapered region has a shape of any one of convex, concave, or a combination thereof.

In one embodiment the first end region of the first unit abuts an internal face of the tapered region of the second unit. This abutment provides friction which acts against the movement of the first and second units. It will be appreciated that the tapered region of the second unit provides an abutment surface which enables different relative orientations of the first and second units due to different abutment positions of the first end region of the first unit against the tapered region of the second unit. Additionally, the tapered region allows the abutment point of the first end region of the first unit to slide, in a longitudinal or concentric direction to the first unit, along the taper surface of the second unit when a sufficient force is applied to overcome the friction between the abutting points of the first and second units. Alternatively, if the elongate member is elastic, a second unit can be temporarily detached from the first unit by extending the elongate member by pulling the first and second units apart, repositioning the units and releasing the first and second units so that the tension in the extended elastic elongate member forces the units to reconnect and remain in position due to the friction between the abutment points of the first and second unit and also due to a compressive force applied to the units by the elongate member if it remains extended to any degree in the repositioned configuration.

It will be appreciated that the degree to which the device can be bent is dependent on the degree of movement of the second unit relative to the longitudinal axis of the first unit. This in turn, may be dependent on the relative widths and shapes of the second end region of the second unit and of the tapered region and second end region of the first unit. This is due to one side of the internal surface of the second unit moving towards a facing outer surface of the first unit when the second unit is moved in a lateral manner. This lateral movement may be restricted due to abutment of the second end region or tapered region of the second unit with the facing outer surface (of either the tapered region or second region) of the first unit.

In a second embodiment, the tapered region and/or the second region of the first unit abuts the second end region of the second unit. In this case, the degree to which the device can be bent may be delimited by the abutment of the outer surface of the first end region of the first unit against the facing internal surface (of the tapered region and the second region) of the second unit.

In a preferred embodiment, the plurality of units is arranged as a substantially vertical stack and is configurable in a first arrangement and a second arrangement, wherein in the first arrangement, each circumferential wall of the plurality of units lie along a single longitudinal axis, and wherein in the second arrangement, a longitudinal axis of the circumferential wall of the first unit is arranged at an angle to a longitudinal axis of the circumferential wall of the second unit in the vertical stack arrangement. Preferably, a bottom unit of the plurality of units is attached to a base, and a top unit of the plurality of units is connected to an attachment means, preferably a light attachment means. Preferably, the flexible elongate member is elastic and is in an extended configuration having greater tension when the plurality of units is in the second arrangement compared to when it is in the first arrangement.

In another preferred embodiment, the plurality of units is formed in a ring such that the first end region of each unit of the plurality of units is received within the second end region of an adjacent second unit of the plurality of units. Preferably, both ends of the flexible elongate member are secured to the same unit. Preferably, the ring is suitable for use as a wheel and further comprises a central hub connected to a plurality of spokes which extend radially from the central hub to the plurality of units and is attached to the plurality of units. Preferably, at least one of the plurality of units is moveable in a direction perpendicular to a plane of the ring.

It will be appreciated that the plurality of units can be made of any material and of any shape which can be arranged together in an interconnected fashion as described above. For example, the units may be made out of a plastic polymer such as PET, synthetic or natural rubber, glass, and rubber suitable for conventional tires. The units may be made of the top portion of plastic bottles and thus provide a recyclable use for them. The flexible elongate member may be a string or rope made from synthetic or natural fibres, or made from an elastic material. Preferably, the flexible elongate member is elastic, for example an elastic thread optionally made of synthetic polymers.

It will be appreciated that when the flexible elongate member is elastic, an increase of flexibility is achieved due to the extendable nature of elastic material. Additionally, use of elastic material also increases the integrity of the structural arrangement of the device due to a compressive force applied to the plurality of units in the direction of the longitudinal axis of the flexible elongate member due to tension experienced by the elastic material when in an extended, tensioned form. The elastic material may be in an extended, tensioned form in all configurations of the device. Preferably, the greater the degree of bending of the device, the greater the elastic material is stretched and thus also the compressive Depending on the relative configurations of the first, second and tapered regions, however, the reverse may be true. That is, the greater the degree of bending of the device, the less the elastic material is stretched and thus also the compressive force applied to the plurality of units. In any case, regardless of the compressive force trend, any compressive force is beneficial as it increases the frictional force experienced at the abutment points between the first unit and the second unit and thus increases the integrity of the device structure.

It will be appreciated that the circumferential wall or peripheral wall of the units can be of any structure which is suitable to receive a second unit in the second end region of the first unit, i.e. where a first end region is of narrower width or smaller circumference than a second end. This feature enables abutment between the first and second units at more than one point, i.e. not just wherein the first and second units lie along the same longitudinal axis. Therefore, some degree of bending and thus increased flexibility can be achieved. The circumferential wall may be, for example, substantially cylindrical, substantially conical, substantially cuboidal, substantially pyramidal, or substantially prismal. Therefore, it is appreciated that the cross sectional shape of the circumferential wall need not necessarily be substantially circular, but may also be substantially square, rectangular or triangular. The shape of the circumferential wall can be chosen to achieve the level of lateral movement desired, for example a substantially cylindrical shape affords a substantially circular cross section which enables lateral movement over the 360° circumference, whereas a cuboidal circumferential wall provides a square or rectangular cross section and restricts lateral movement in two defined planes which bisect the walls of the cuboid, and a substantially prismal circumferential wall enables lateral movement in three defined planes which bisect the walls of the prism. Further movement of the spine can be obtained by rotation at its base or any of the units.

The circumferential wall with a circular cross sectional shape for the first end region, second end region and the tapered region, affords smooth lateral movement of the individual units of the plurality of hollow units and greater freedom, 360° C. freedom, of lateral movement. It will be appreciated that bending of the units in different lateral directions can be achieved due to respective lateral movement of the units. Therefore, a plurality of bending configurations can be achieved, for example, C and S-shape structures.

Thus, two structures in particular are noted: a vertical spine and a ring or circular wheel-like structure. The structures might lend themselves to various applications, for example, as desk lamps in the case of the vertical structures wherein an electric cable passes through the length of the nested units alongside the flexible elongate member. In the case of the wheel like structure, this has a number of different applications where a rotating sphere is required but with an added degree of flexibility.

The vertical spine as described herein has a particular movement characteristic: when manipulated the structure can hold its new position relative to the last. Each time the structure is manipulated it can change to a new position and come to rest and hold this new position. This is due to the shape of the bottle necks along with the central elastic thread or string applying tension and binding the structure together.

The wheel-like structure as described herein offers certain characteristics too, on the one hand it can rotate like a conventional wheel, but in this case it also offers lateral movement or play. A conventional wheel is rigid and rotates in a circular motion but the whole structure must be angled for the wheel to change direction. With the present wheel like structure, with each component unit being able to move relative to the other components, it provides an additional lateral dimension that a conventional wheel does not have.

This specific combination of features increases the flexibility of the spine or ring such that non-linear and non-planar arrangements of the spine and ring structures can be achieved.

BRIEF DESCRIPTION OF THE DRAWINGS

The invention can be performed in various ways, but embodiments will now be described by way of examples, and with reference to the accompanying drawings, in which.

DETAILED DESCRIPTION

As shown in FIGS. 1 to 6, in one embodiment the device can be arranged as a vertical stack (18).

Figure 1:
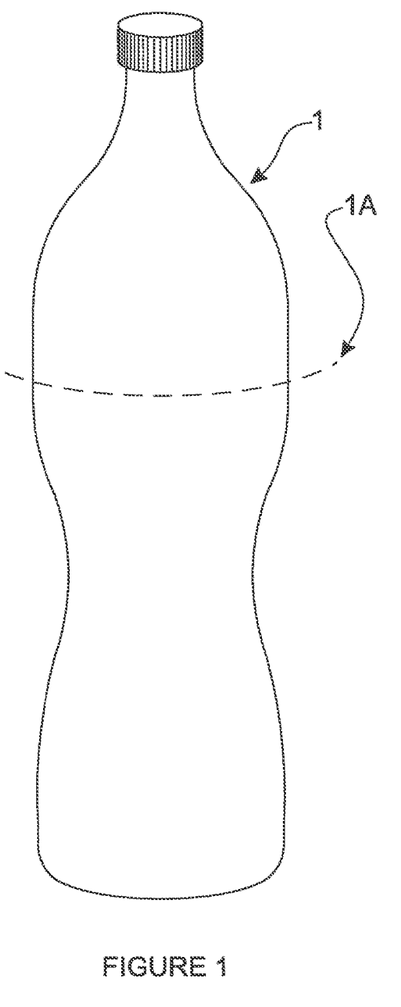
FIG. 1 shows a PET bottle before being cut to form a unit of the device.

FIG. 1 shows a PET bottle 1 dissected at some point 1A below the neck which provides a single unit with good dimensions for a series comprising other such PET bottle units suitable for being held together in an interconnected arrangement.

Figure 2:
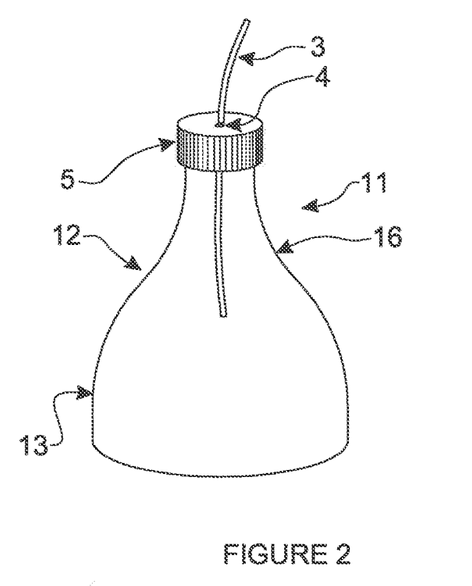
FIG. 2 shows a cut portion of a PET bottle suitable as a unit of the device.

FIG. 2 shows the cut portion of the PET bottle which acts as the hollow unit of the plurality of units. The bottle cap 5 and cut body portion of the bottle make up the circumferential wall 12 of a unit of the plurality of units. The cap of the bottle 5 provides the first end region, the shoulder 16 of the bottle provides a tapered region, and the substantially cylindrical lower part 13 of the cut portion 11 of the bottle provides the second end region. This cut portion, has a small hole 4 drilled through its bottle cap 5 to accommodate a flexible elongate member 3 which may be an elastic thread or string and which is passed through the hole in the bottle cap. A hole 4 drilled or punctured through the PET bottle cap 5 may be used to guide the elastic thread through each subsequent bottle unit.

Figure 3:
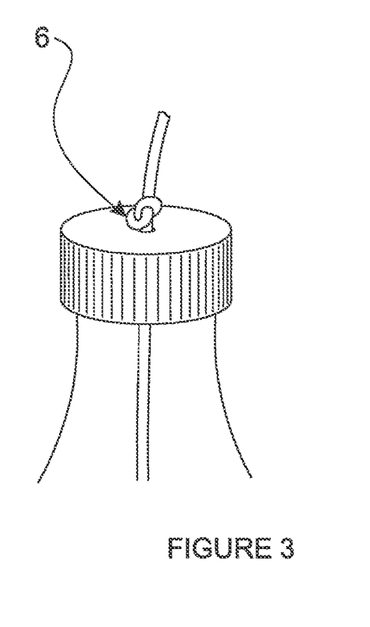
FIG. 3 is an enlarged view of the first end region of a PET bottle unit.

FIG. 3 shows a knot 6 tied in the end of the elastic thread or string, so as to not allow the thread-end to pass through the bottle cap hole. A knot 6 in the end of the elongate member secures it so that it cannot be pulled through the first bottle unit in the series. Any other securing device might be used instead of a conventional knot. A similar knot or securing device at the other end of the thread would be used to maintain tension created by the pulling tight of the elastic thread or string.

Figure 4:
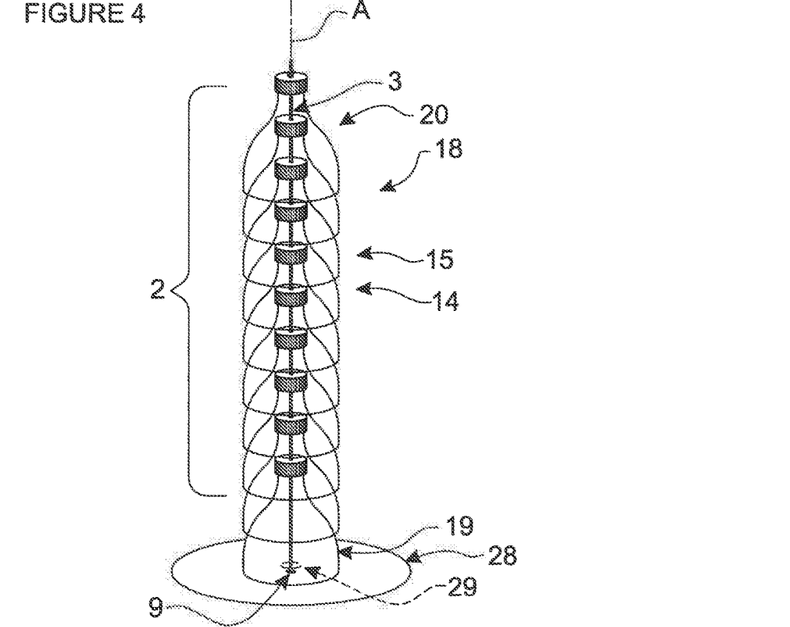
FIG. 4 shows a first embodiment of the device in a first arrangement of a vertical stack.

FIG. 4 shows a vertical stack 18 consisting of a number of bottle head units 2 inserted on top of one another, for example a first unit 14 and a second unit 15. The units are all held together with the flexible elongate member 3. The elongate member is secured to the vertical stack 18 at a base 28 by passing through a hole 29 of the base 28. Tension is created by pulling the elastic thread or string taut and then forming a knot 9 (or other securing device) on the underside of the base structure to maintain tension. The elongate member 3 is taut and provides static strength to the system which stabilises the structure in addition to the friction at the abutment points of the units. When an elastic thread is used as the elongate member the knots (6 and 9) exert a compressive force on the units due to the tension of the elongate member. FIG. 4 show a first arrangement of the vertical stack wherein all units of the plurality of units, including, a bottom unit 19 and a top unit 20, lie along a single longitudinal axis A.

Figure 5:
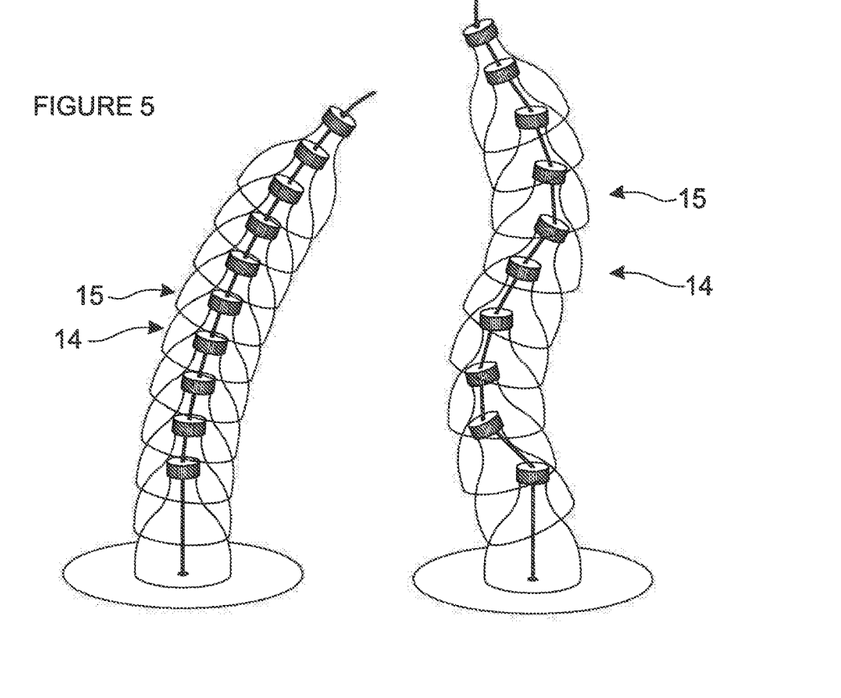
FIG. 5 shows the first embodiment of the device in two different second arrangements of the vertical stack.

FIG. 5 shows two examples of how the vertical spine of interconnected units can be moved into a second arrangement wherein the longitudinal axis of the circumferential wall 12 of the second unit 15 is arranged at an angle to the longitudinal axis of the circumferential wall 12 of the first unit 14. With each movement and new configuration, the spine can come to rest in whatever position it is left due to the presence of the static strength and friction as explained in the first arrangement of FIG. 4. Factors which can affect the movement of the spine structure are the tension in the elastic thread, the friction at the abutment points between adjacent units and the size and dimension of the individual interlocking units. Employment of an elastic material for the flexible elongate member, for example an elastic thread, increases the static strength and thus flexibility sinces configurations with a greater degree of bending can be attained compared to non-elastic flexible elongate members. This is due to a compressive force applied to the plurality of units but the elastic elongate member which increases the friction at abutment points of the units.

Figure 6:
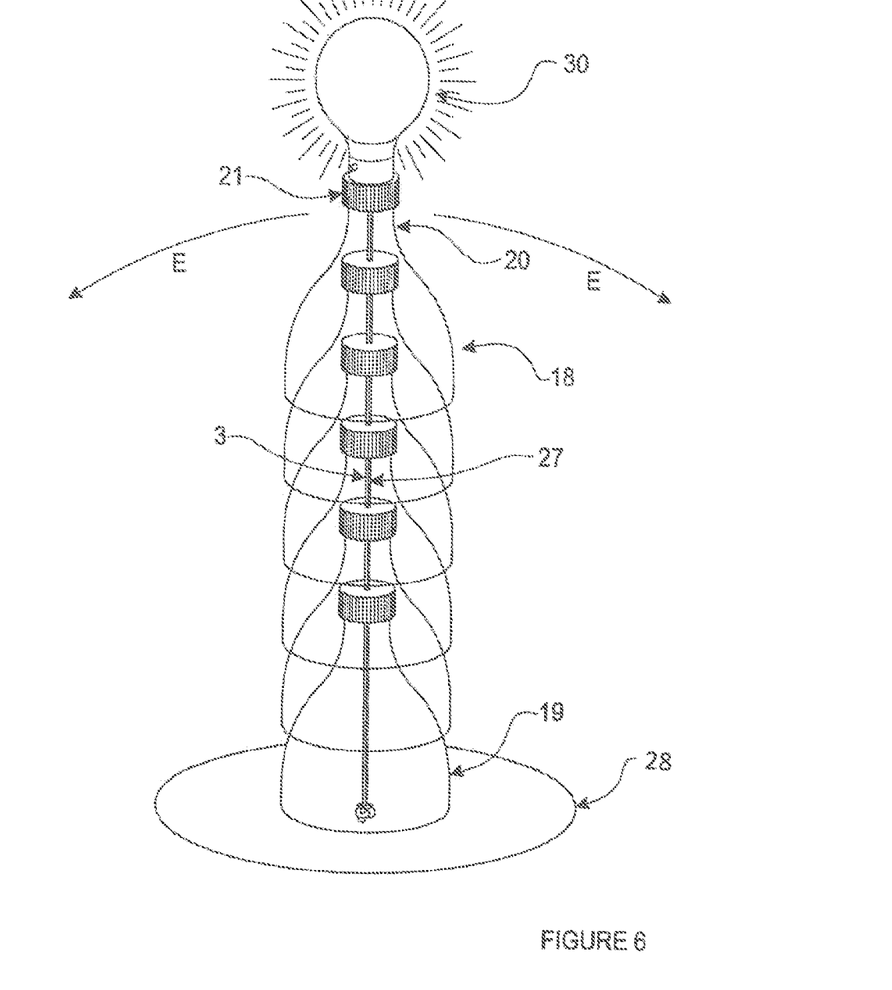
FIG. 6 shows the vertical stack configuration in a specific application.

FIG. 6 exemplifies an application of the vertical stack configuration by providing the stem of a light. The arrows E indicate lateral movement of the units in the plane of the page for focusing the light. Such lateral movement can be achieved over the 360° and not limited to a single plane. A bulb 30 is attached to the attachment 21 connected to the top unit 20 of the vertica stack 18. The flexible elongate member 3 may also act as an electrical wire for the supply of electricity to the bulb 30. Alternatively, a separate electrical wire 27 to the flexible elongate member 3 may be provided. Further features for a lamp which are not identified in FIG. 6 are part of the common general knowledge and thus need explicit mention.

Therefore a vertical spine configuration of the device has two significant properties: it has flexibility due to the lateral movement of the units, but also stability due to the friction at the abutment points where the interconnected units abut each other. The structure is flexible as it can be moved or manipulated to form a new shape, and it will maintain this position relative to the last once let go due to the friction at the abutment points of the units and due to the tension in the elastic thread or string.

As shown in FIGS. 7 to 10, in another embodiment the device is arranged in the form of a ring 22.

Figure 7:
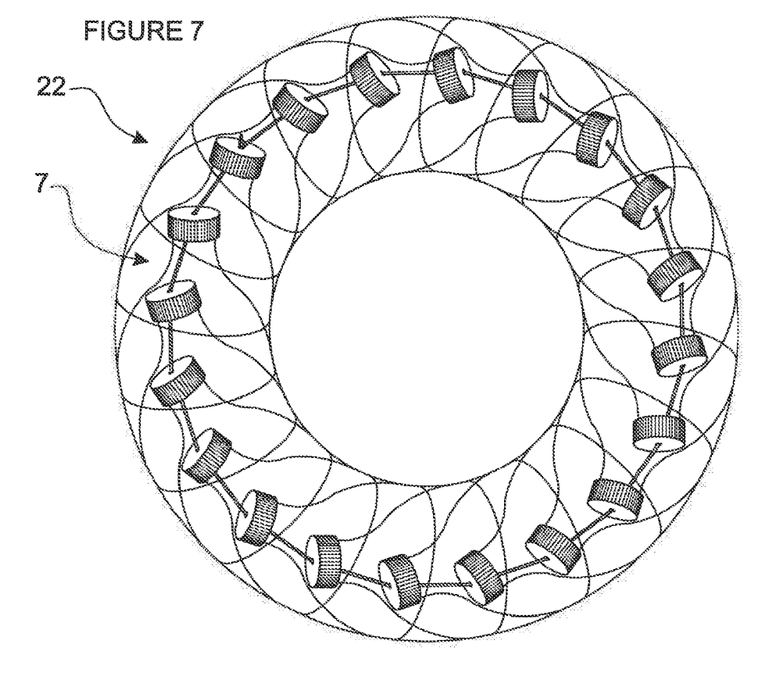
FIG. 7 is a side view of a second embodiment in a ring configuration.

FIG. 7 shows the interconnected units assembled into a ring 22. The flexible elongate member 3, for example an elastic thread, holds the structure firmly in place.

Figure 8:
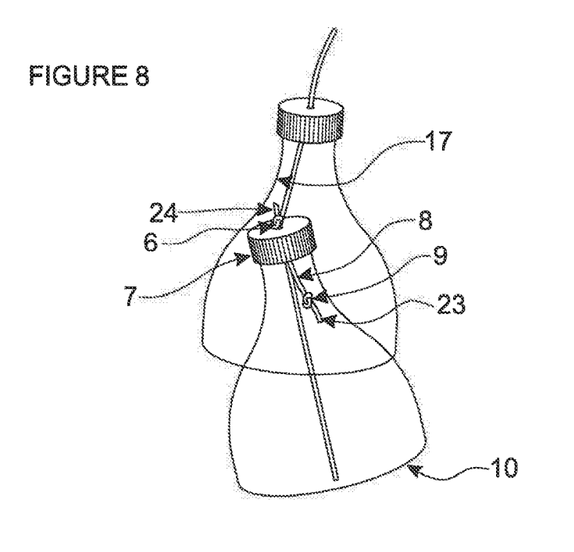
FIG. 8 is an exploded view of two units in the ring embodiment.

FIG. 8 shows how a ring structure is formed. An elastic thread passes full circle starting from a first bottle head 7 in the series and then back through this first bottle head in the chain of interconnected units. The integrity of the ring structure is maintained by creating tension in the structure by tying a knot 6 and passing the elastic thread through the first bottle head 7 in the series and then pulling the elastic thread tight and passing the trailing end of the thread 8 back through the first bottle unit in the series before another knot 9 is tied. Consequently, each end 23, 24 of the flexible elongate member may be secured to the same unit. It is important in the case of this ring structure to know that the second knot 9 is made on the outside of the bottles by pulling the elastic cord out at the circumference base 10 of the first and last bottle unit. Once the desired tension has been created, the elastic can be released and will slip back inside the circular structure to remain intangible from the outside. By binding the component PET bottle heads using this method results in a wheel-like structure with particular movement characteristics: similar to a conventional wheel this structure rotates in the usual way, but because of the use of elastic thread and its structure made up of component units pieces, it also affords a lateral movement that any conventional wheel does not have. The inter-connecting units have a flexibility of movement in relation to each other which provides the lateral dimension.

Figures 9, 10:
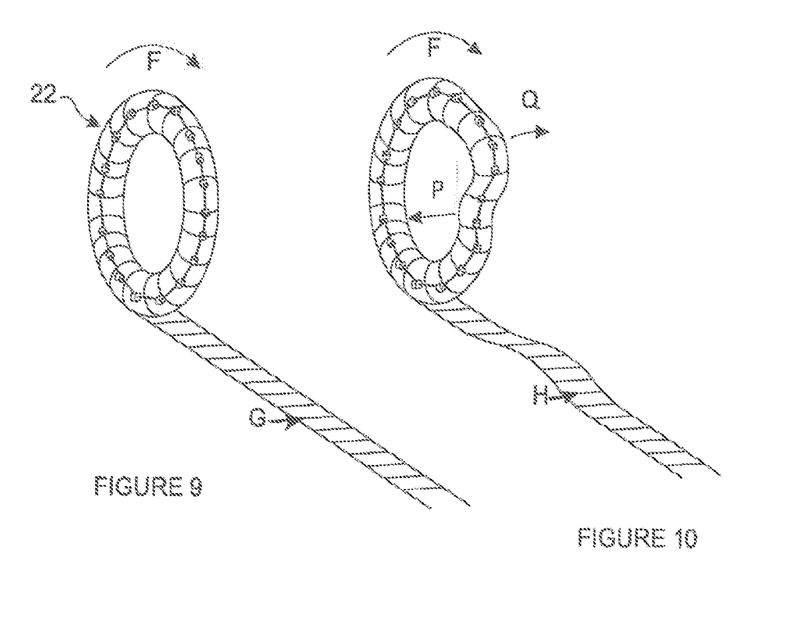
FIG. 9 shows the track caused by a conventional ring or wheel.
FIG. 10 shows the track caused by a ring or wheel wherein some of the units have been moved laterally.

In FIGS. 9 and 10 the direction of rotation of a ring or wheel is indicated by F. FIG. 9 depicts a rotational movement like any normal wheel like structure. FIG. 9 also includes the potential lateral movement potentiality of the interconnected wheel like structure due to its flexible elongate member (e.g. an elastic member, or elastic thread). Marks G and H are represent the tracks or surface lines that the wheel like structures would make. In the case of the ring like structure of FIG. 10, where lateral movements P, Q of some of the interconnected parts were initiated, its track or surface line would reflect such. In other words, it would be possible to alter the direction that a wheel took along the surface simply by altering some of the interconnected parts.

Figure 11:
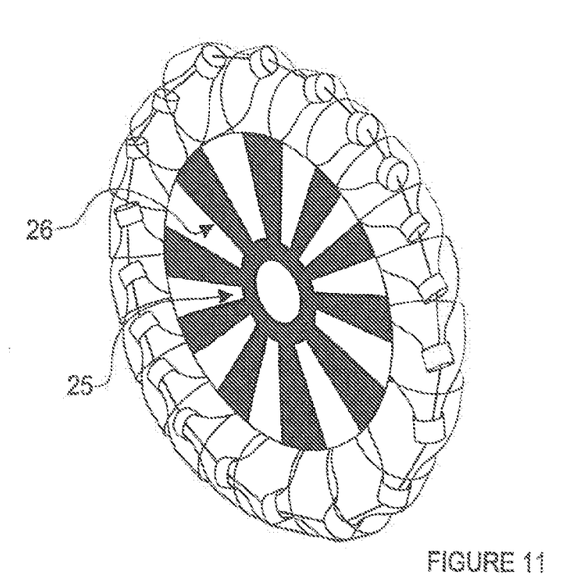
FIG. 11 shows the ring configuration used in a wheel embodiment.
Figure 12:
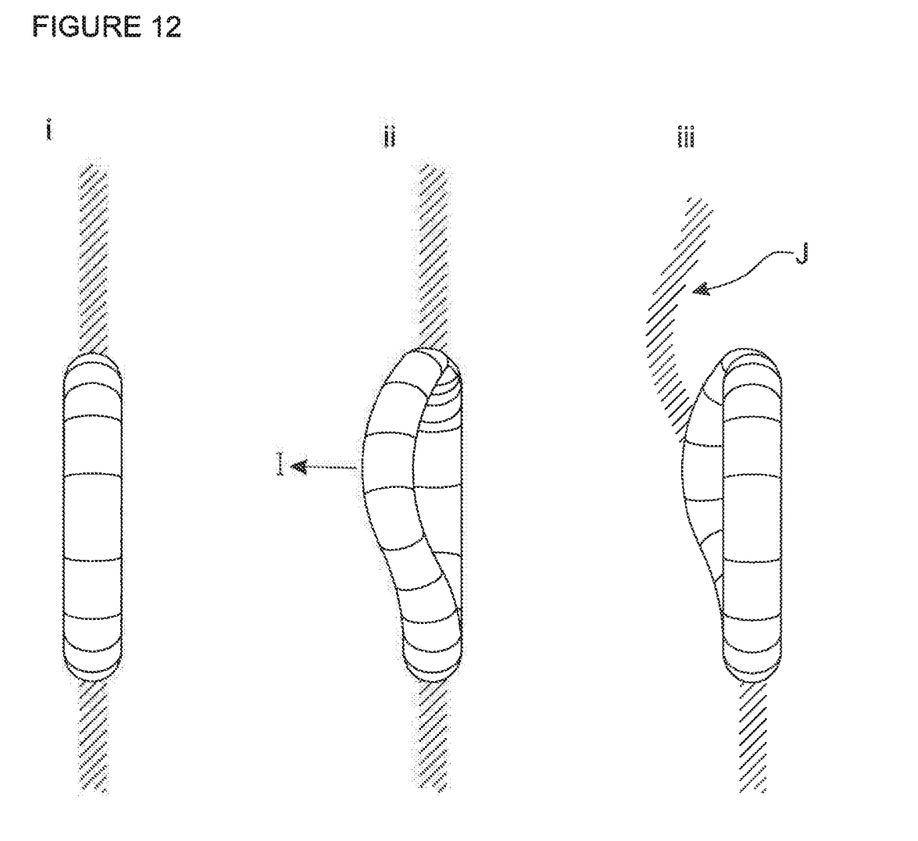
FIG. 12 shows plan views of the wheel embodiment in a conventional wheel arrangement (FIG. 12 (*i*)), and where some of the spokes have been moved laterally (FIG. 12 (*ii*) and (*iii*)).

As shown in FIGS. 11 and 12, one application of the ring structure is for use as a wheel for a vehicle, for example for a 4×4 vehicles, moon buggy or the like.

In this case, it would be important that the components making up the interconnected structure would comprise a stiff rubber much like the rubber found on a conventional wheel, rather than PET. The rubber would be shaped or moulded into the appropriate shape (similar to the shape of the PET bottles). Maintaining or augmenting the overall circular strength of the wheel could be achieved by the increasing tension applied through pulling the elastic thread tighter.

FIG. 11 depicts a wheel of interconnected units that have a series of 30 spokes 26 attached to the units and connecting to a central hub 25. Each spoke may be attached to a separate unit and by manipulating some of the interconnected units on the wheel each wheel spoke may independently adjust, thus causing lateral movement so that a vehicle might avoid an obstacle without having to turn the entire wheel left or right of the object using the conventional mechanism of a steering column. Preferably, alternatively the spokes may be adjusted by a mechanical device residing in the hub and thus mover units independently laterally.

Additionally, the lateral movement of units in the wheel allows a different and novel turning mechanism for wheels in vehicles. The conventional thread of a conventional wheel is shown for comparative purposes, in FIG. 12 (*i*). The turning mechanism is achieved by moving some of the spokes laterally, in a direction I as indicated in FIG. 12 (*ii*), out of the plane of the wheel when the spokes are not in contact with a surface. For example, 2, 3 or 4 spokes may be moved and when these spokes next come to land on the surface through rotation of the wheel they would offer a new directional pathway (path J) for the wheel (FIG. 12 (iii)).

Figure 13:
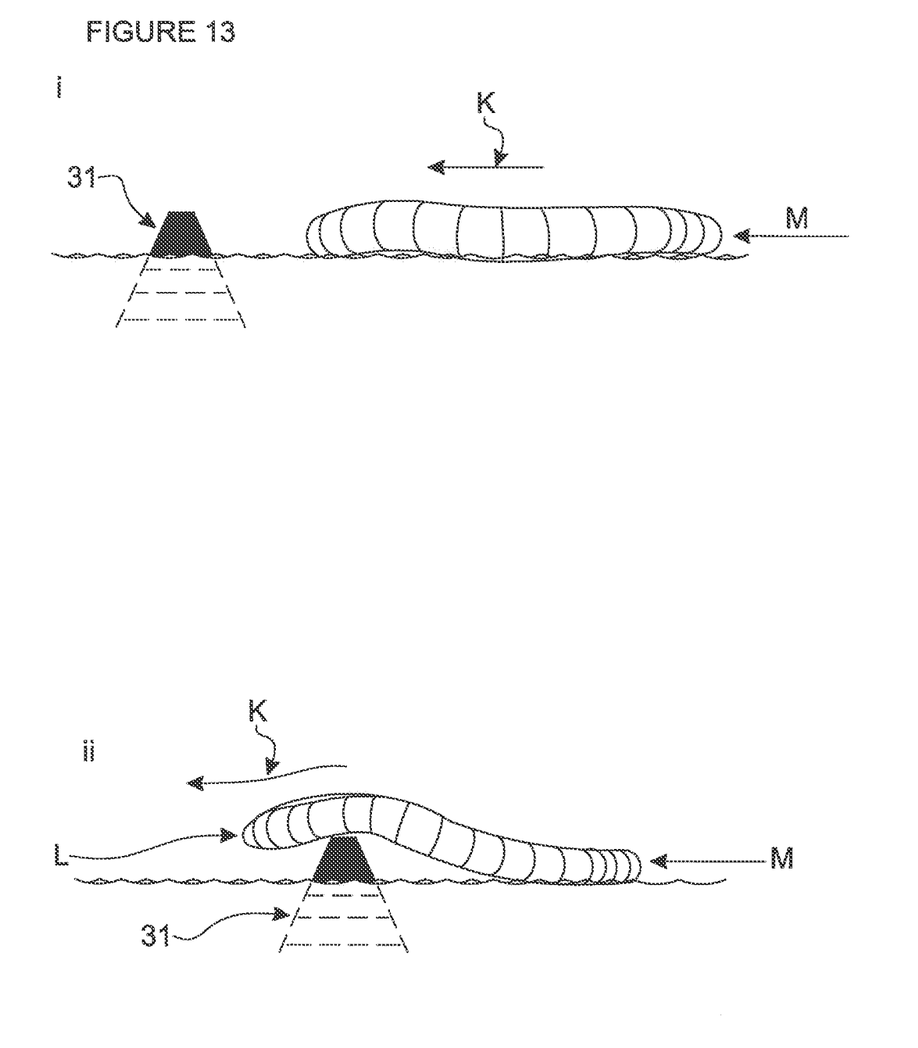
FIG. 13 shows a ring configuration for use as a floating device in a conventional ring arrangement (FIG. 13 (*i*)) and in an adjusted arrangement (FIG. 13 (*ii*))

As shown in FIG. 13 (*i*) and FIG. 13 (*ii*), another application of the ring structure is for use as a floating device. In this case the individual units would be made of appropriate material for floating on water, for example some light polymer composition or PET bottles. The floating device, for example, would sit horizontally on the surface of the water travelling in a direction K. Adjustment of some of the units of the floating device such that the units at the front of the floating are raised above the surface of the water, the leading edge L would thus travel over an object 31 or wave while the remaining, unadjusted units M comprising the whole structure remained in contact with the water. Such a configuration can be used float over objects, or catch a floating object which can subsequently be trapped by lowering the raised units L. The floating device, may for example, also provide an adjustable wall for a dingy. The floating device may or may not also include a spoke and central hub arrangement similar to the wheel embodiment disclosed above but made of appropriately light material to float on water, for example plastic.

Figure 14:
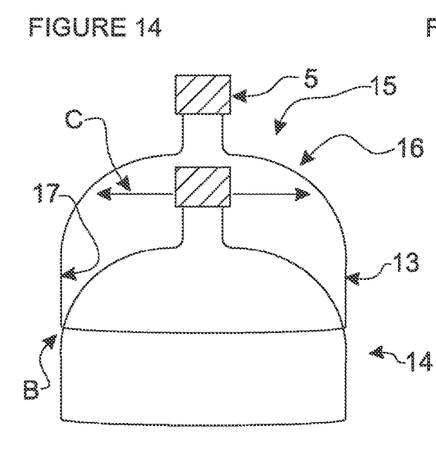
FIGS. 14 to 16 show alternative examples of shapes of the interconnected units.
Figure 15:
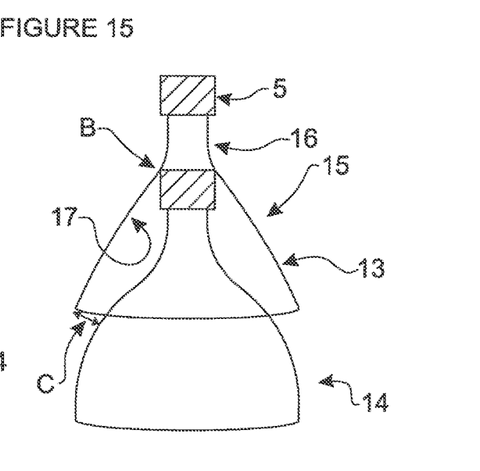
Figure 16:
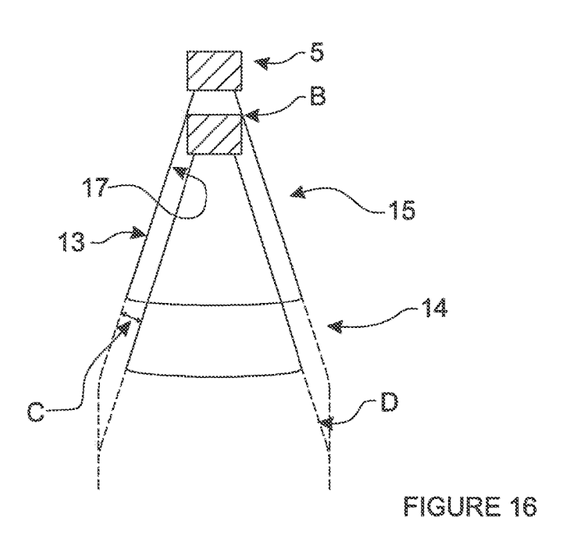

FIGS. 14 to 16 exemplify some of the unit shapes which are suitable for the claimed invention and the abutment points where the first unit 14 abuts the internal surface 17 of the second unit 15. These shapes are typically found in common PET bottles. Some bottles for example will have a short neck (first region 5), fully-rounded shoulders (tapered region 16) and some body (second region 13), depending on where they might have been dissected or cut into two, for the purposes of this invention, as shown in FIG. 14. Others units will have a joined neck 5 and gently-sloping shoulder 16 with very little body 13 as shown in FIG. 15. Others might have just a first end region 5 and a second end region 13, the second end region also acting as a tapered region in this instance, FIG. 16. The dotted line D in FIG. 16 also indicates that a unit having and extension represented by the dotted lines is also suitable. Abutment points B where the first unit abuts the second unit are also indicated in FIGS. 14 to 16. The lateral movement of the first or second units are indicated by C. This exemplifies how the degree of movement and thus flexibility and bending properties of the device or nested structure may be dictated by the relative shapes of the circumferential walls of the units, i.e. the shape of PET bottles for example (or other material or physical body).

In FIG. 14 two PET bottles with some body 13, when nested together, will allow for ample manoeuvrability C as the bottle head 5 has enough space to move and the second unit slide along the outer surface of the first unit. The two PET bottles abut in the tapered region or second end region of the first unit 14 and in the second end region of the second unit (i.e. point B).

In FIG. 15 two PET bottles with a small body (i.e. tapered region and second region) abut in the first end region of the first unit and in the tapered region of the second unit (i.e. point B). Here, the head of the uppermost PET bottle now appears not to have any space to move laterally, however, the first unit has ample flexibility to move in relation to the lower PET bottle, as indicated by C and the first unit can slide along the inner surface of the second unit.

In FIG. 16 the PET bottles featuring long straight shoulders which act as the second region 13, and maneuverability C, although restricted, is still possible thus still providing flexibility and bending properties to the device. Here the two bottles abut in the first end region of the first unit and the second end region of the second unit, i.e. point B. Further, extension of the units along the dotted line D provide a second end region of cylindrical shape which would also provide maneuverability but this time at the point where the dotted lines merge, i.e. in a separate tapered region to the second end region of the second unit and the second end region of the first unit.

It will be appreciated that whilst the examples of the invention detail interconnected units being made from PET bottles (or the spine and floating device) or conventional tire rubber (for the wheel device) the same principles could be extended to any other material of similar shape in place of these materials.

The invention claimed is:
1. A device comprising:
   a plurality of hollow units, each unit comprising a circumferential wall having a first end region and a second end region, wherein the first end region is narrower than the second end region and the plurality of units are in an interconnected arrangement, such that
      the first end region of a first unit of the plurality of units is received within the second end region of a second unit of the plurality of units, and a flexible elongate member extends longitudinally through the interconnected units, whereby the circumferential walls of the interconnected first and second units abut each other and the interconnected units are secured together; and the plurality of units is formed in a ring such that the first end region of each unit of the plurality of units is received within the second end region of an adjacent second unit of the plurality of units; wherein the device is suitable for use as a wheel further comprising a central hub and a plurality of spokes which are connected to the central hub, said plurality of spokes extending radially from the central hub to the plurality of units and being attached to the plurality of units, and wherein at least one of the plurality of units is moveable in a direction perpendicular to a plane of the ring.

2. The device according to claim 1 wherein each end of the flexible elongate member is secured to the same unit.

3. The device according to claim 1 wherein each unit comprises at least any one of a plastic polymer, PET, synthetic or natural rubber, and rubber suitable for conventional tires.

4. The device according to claim 1 wherein the flexible elongate member is elastic and wherein it is in an extended more tensioned form when the plurality of units is in a second arrangement compared to when it is in a first arrangement.

5. The device according to claim 1 wherein the first end region of each circumferential wall is substantially cylindrical, and wherein the circumferential wall comprises a tapered region which tapers towards the first end region.

6. The device according to claim 5 wherein the second end region is substantially cylindrical and of greater circumference than the first end region, and wherein the tapered region connects the first end region and second end region.

7. The device according to claim 6 wherein the tapered region and/or the second region of the first unit abuts the second end region of the second unit.

8. The device according to claim 5 wherein the tapered region has a shape of any one of convex, concave, or a combination thereof.

9. The device according to claim 5 wherein the first end region of the first unit abuts an internal face of the tapered region and second region of the second unit.

10. The device according to claim 1 wherein the flexible elongate member is any one of a string, rope or elastic thread.

* * * * *